United States Patent
Ghannam et al.

(10) Patent No.: US 10,112,452 B2
(45) Date of Patent: Oct. 30, 2018

(54) TRAILER AND PACKAGING SYSTEM FOR TRAILER ELECTRICAL COMPONENTS

(71) Applicant: FORD GLOBAL TECHNOLOGIES, LLC, Dearborn, MI (US)

(72) Inventors: Mahmoud Yousef Ghannam, Canton, MI (US); Swadad A. Carremm, Canton, MI (US); Joel Allen Pittenger, Rochester Hills, MI (US); Roy Joseph Scott, Saline, MI (US); David James Tippy, Ann Arbor, MI (US); Steven Yellin Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

(21) Appl. No.: 14/810,027

(22) Filed: Jul. 27, 2015

(65) Prior Publication Data
US 2017/0028800 A1 Feb. 2, 2017

(51) Int. Cl.
- *B60D 1/60* (2006.01)
- *B60D 1/62* (2006.01)
- *B60D 1/64* (2006.01)
- *B62D 63/08* (2006.01)

(52) U.S. Cl.
CPC .............. *B60D 1/64* (2013.01); *B60D 1/605* (2013.01); *B60D 1/62* (2013.01); *B62D 63/08* (2013.01)

(58) Field of Classification Search
CPC . B60D 1/60; B60D 1/605; B60D 1/62; B60D 1/64; B62D 63/08
See application file for complete search history.

(56) References Cited

U.S. PATENT DOCUMENTS

| | | | | |
|---|---|---|---|---|
| 615,420 A | * | 12/1898 | Baker | H01R 13/5213 439/35 |
| 3,915,476 A | * | 10/1975 | Burkle | B60D 1/64 280/422 |
| 4,017,136 A | * | 4/1977 | Sasgen | B61G 5/10 191/11 |
| 4,343,522 A | * | 8/1982 | O'Neil | B61G 5/10 307/9.1 |
| 4,738,641 A | * | 4/1988 | Eversole, Jr. | H01R 13/60 248/314 |
| 4,781,393 A | * | 11/1988 | Jeter | H01R 35/02 307/10.1 |
| 4,864,288 A | * | 9/1989 | Cross | B60R 25/1007 307/117 |

(Continued)

FOREIGN PATENT DOCUMENTS

| EP | 2025536 A1 * | 2/2009 | ............ B60D 1/143 |
|---|---|---|---|
| WO | 2013119276 A1 | 8/2013 | |

*Primary Examiner* — Joseph M Rocca
*Assistant Examiner* — Maurice L Williams
(74) *Attorney, Agent, or Firm* — Frank MacKenzie; Brooks Kushman P.C.

(57) ABSTRACT

A trailer yaw sensing apparatus is provided. The trailer yaw sensing apparatus includes a housing, a yaw sensor, and a docking station. The housing is configured for installation on a trailer. The housing defines apertures that are configured to engage fasteners for mounting yaw sensors in a plurality of orientations. The yaw sensor includes an external casing and is disposed within the housing. The docking station is affixed to the housing and is configured to receive a trailer-to-vehicle electrical connector.

17 Claims, 5 Drawing Sheets

(56) References Cited

U.S. PATENT DOCUMENTS

| | | | | |
|---|---|---|---|---|
| 5,302,141 | A * | 4/1994 | O'Reilly | B60D 1/64 |
| | | | | 439/144 |
| 5,458,357 | A * | 10/1995 | Wohlhuter | B62D 53/125 |
| | | | | 280/420 |
| 5,558,350 | A * | 9/1996 | Kimbrough | B60D 1/06 |
| | | | | 280/426 |
| 5,660,408 | A * | 8/1997 | Johnson | B60D 1/62 |
| | | | | 248/75 |
| 5,765,848 | A * | 6/1998 | Silvey | B60D 1/62 |
| | | | | 280/422 |
| 6,398,252 | B1 * | 6/2002 | Ishikawa | B60R 16/0239 |
| | | | | 280/727 |
| 6,638,083 | B2 | 10/2003 | Rhude | |
| 7,491,065 | B2 | 2/2009 | Wagner | |
| 7,889,062 | B1 * | 2/2011 | Albisa | B60D 1/52 |
| | | | | 280/501 |
| 7,932,623 | B2 | 4/2011 | Burlak et al. | |
| 8,475,176 | B2 | 7/2013 | Holmes et al. | |
| 8,955,864 | B2 * | 2/2015 | Palen | F16L 3/003 |
| | | | | 280/420 |
| 9,124,032 | B2 * | 9/2015 | Arakelian | H01R 4/36 |
| 2005/0206225 | A1 * | 9/2005 | Offerle | B60T 8/1706 |
| | | | | 303/7 |
| 2007/0072461 | A1 * | 3/2007 | Williams | H01R 13/639 |
| | | | | 439/144 |
| 2010/0026029 | A1 * | 2/2010 | Easling | B60T 17/04 |
| | | | | 296/37.6 |
| 2013/0253814 | A1 * | 9/2013 | Wirthlin | G01G 19/02 |
| | | | | 701/124 |
| 2015/0051795 | A1 * | 2/2015 | Keys, II | B60D 1/248 |
| | | | | 701/41 |
| 2016/0106214 | A1 * | 4/2016 | Hagen | H05K 5/0204 |
| | | | | 361/679.21 |
| 2016/0282466 | A1 * | 9/2016 | Epler | B62D 53/06 |

* cited by examiner

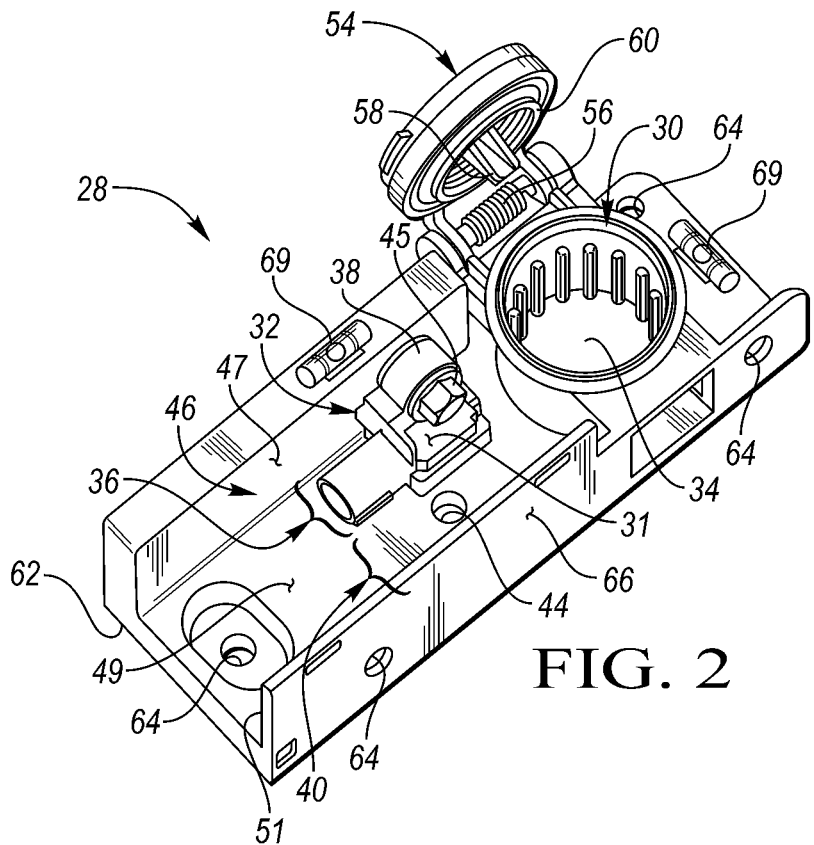
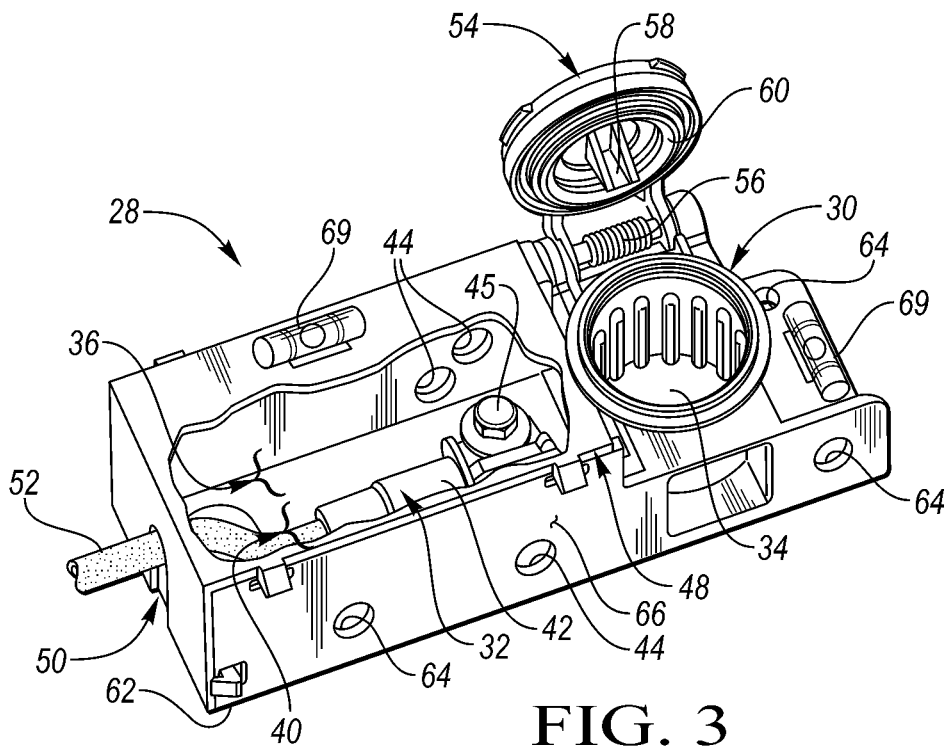

TRAILER AND PACKAGING SYSTEM FOR TRAILER ELECTRICAL COMPONENTS

TECHNICAL FIELD

The present disclosure relates to trailers and packaging systems for electrical components of trailers.

BACKGROUND

Electrical components for trailers, including sensors, wire harnesses, connectors, and other devices, may require protection from dirt, gravel, mud, ice, and other environmental conditions.

SUMMARY

A trailer yaw sensing apparatus is provided. The trailer yaw sensing apparatus includes a housing, a yaw sensor, and a docking station. The housing is configured for installation on a trailer. The housing defines apertures that are configured to engage fasteners for mounting yaw sensors in a plurality of orientations. The yaw sensor includes an external casing and is disposed within the housing. The docking station is affixed to the housing and is configured to receive a trailer-to-vehicle electrical connector.

A trailer yaw sensing apparatus is provided. The trailer yaw sensing apparatus includes a housing configured for installation on a trailer. The housing defines mounting holes configured to engage fasteners for mounting the housing to the trailer in multiple orientations relative to the trailer. The housing includes an external non-energized socket configured to receive a trailer-to-vehicle electrical connector. The housing defines at least one internal chamber configured to receive yaw sensors. A yaw sensor that includes an external casing is disposed within an internal chamber of the housing.

A trailer system is provided. The trailer system includes a frame, a trailer-to-vehicle electrical connector, a housing secured to the frame, and a yaw sensor. The housing includes an external socket configured to receive the trailer-to-vehicle electrical connector and defines an internal chamber configured to receive a sensor. The yaw sensor is mounted within the internal chamber. A retractable cover is configured to enclose and seal the socket when the trailer-to-vehicle electrical connector has not been received into the socket.

BRIEF DESCRIPTION OF THE DRAWINGS

FIG. 2 is an isometric view of a first embodiment of a housing that includes a docking station for a trailer-to-vehicle electrical connector and a yaw sensor mounted to the housing at a first location;

FIG. 3 is an isometric view of the first embodiment of the housing with the yaw sensor mounted to the housing at a second location;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
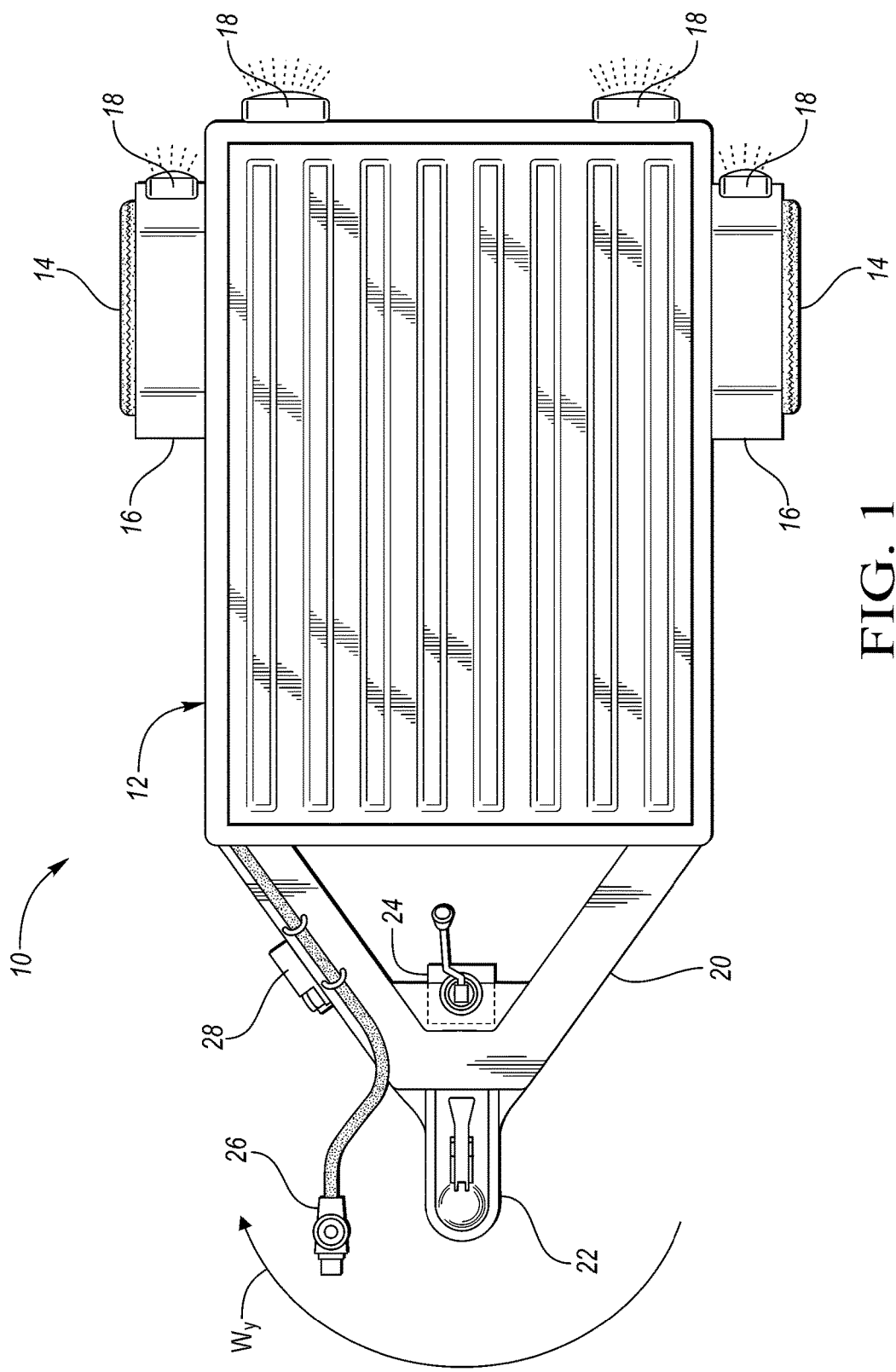
FIG. 1 is a top view of a trailer or trailer system.

Referring to FIG. 1, a trailer 10 (or trailer system) that is configured to be towed by a vehicle is illustrated. The trailer 10 may include a bed 12 that is configured to receive items that are to be transported by the trailer 10. The trailer 10 may include wheels 14. The wheels 14 may be housed within a wheel well 16. The wheels 14 may be attached to wheel bearings and an axle (not shown). The wheels 14 may include a braking system (not shown). The braking system may include any type of mechanical or electrical braking system known in the art. For example the braking system may include brake pads that engage rotors or drums. The brake pads may be operated by hydraulic pressure or an electrical mechanical device, such as electric motors or electrical solenoids. The trailer 10 may also include a lighting system that comprises a series of lights 18 that are required so that the trailer 10 may be legally operated on public roads or highways. The lights 18 may include nighttime lights, braking lights, backup lights, turn signals, etc.

The trailer 10 may also include a frame 20 that is configured to provide strength to the trailer 10, such that the trailer 10 may support a load. A towing connection 22 may be connected to the frame 20. The towing connection 22 may be configured to couple the trailer 10 to a mating component located on a towing vehicle. The towing connection 22 may be a tow ball coupler (which typically is a ball socket) that is configured to receive a tow ball located on the towing vehicle. Alternatively, the towing connection 22 may be an eyebolt, lunette ring, or some other form of eye coupler that is configured to engage a tow hook or pintle hook located on the towing vehicle. The type of towing connection 22 should not be construed as limited to the types towing connection listed herein and should be construed to cover all types of towing connections known in the art. The trailer 10 may also include a lift or jack 24 that is configured to raise or lower the towing connection 22 when either coupling or decoupling the towing connection 22 to the mating component located on the towing vehicle. Furthermore, the trailer 10 may include safety chains (not shown) that are configured to provide an additional coupling between the trailer 10 and the towing vehicle.

A trailer-to-vehicle electrical connector 26 may be connected to the trailer 10 and configured to provide an electrical connection between the systems of the trailer 10 and the towing vehicle. For example, the lighting system of the trailer 10 may be connected with the lighting system of the towing vehicle in order to synchronize the trailer lights 18 with the lights of the towing vehicle including the nighttime lights, braking lights, backup lights, turn signals, etc. The trailer-to-vehicle electrical connector 26 may also provide an electrical connection between the braking system of the trailer 10 and a braking system of the towing vehicle. Furthermore, the trailer-to-vehicle electrical connector 26 may include electrical connections between control systems of the trailer 10 and the towing vehicle to facilitate functions such as self-parking, electronic trailer steering, electronic stability control, trailer sway control, traction control, anti-lock braking, automatic braking, etc.

Cameras, crash detection sensors, tire pressure sensors, acceleration sensors, braking engagement/pressure sensors, and/or other sensors or electrical components may be located on the trailer 10 and configured to communicate with the control systems of the trailer 10 and/or the control systems of the towing vehicle in order to assist in driving, backing up, or parking the trailer 10. The cameras, crash detection sensors, tire pressure sensors, acceleration sensors, braking engagement/pressure sensors, or other electrical components may also communicate with the control systems of the trailer 10 and/or the towing vehicle to assist in self-parking, electronic trailer steering, electronic stability control, trailer sway control, traction control, anti-lock braking, automatic braking, or other control functions of the trailer 10 or towing vehicle.

Some of the electrical components of the trailer 10 may be secured within a housing 28 in order to protect the components from water, dirt, mud, inclement weather, or other external conditions that may cause damage to the electrical components. The housing 28 may be configured for installation on several difference locations and orientations on the trailer 10. For example, the housing may be secured to the frame 20 of the trailer 10.

Referring to FIGS. 2 and 3, a first embodiment of a housing 28 is illustrated. The first embodiment of the housing 28 includes a docking station 30 disposed externally on the housing 28. The housing 28 is further configured to house a yaw rate sensor 32. The yaw rate sensor 32 may include an external casing 31. The docking station 30 may be configured to receive the trailer-to-vehicle electrical connector 26. The docking station 30 may include an externally located non-energized socket 34 that is configured to receive the trailer-to-vehicle electrical connector 26. The yaw rate sensor 32 may be disposed within the housing 28 and configured to detect a yaw rate, $\omega_y$, of the trailer 10 (as shown in FIG. 1). The housing 28 may include a plurality of mounting locations and orientations. For example, a first mounting location 36 for the yaw rate sensor 32. The yaw rate sensor 32 may be in a first orientation 38 when mounted to the housing 28 in the first mounting location 36 (as shown in FIG. 2). The housing 28 may include a second mounting location 40 for the yaw rate sensor 32. The yaw rate sensor 32 may be in a second orientation 42 when mounted to the housing 28 in the second mounting location 40 (as shown in FIG. 3).

Additional orientations of the yaw rate sensor 32 may also be included. For example, the housing 28 may include a plurality of internal walls that define apertures 44 that are configured to engage fasteners 45 for mounting the yaw rate sensor 32 in several orientations. The housing 28 may include a first internal wall 47, a second internal wall 49, and a third internal wall 51 that each define apertures 44 configured to engage fasteners 45 for mounting the yaw rate sensor 32. The second internal wall 49 may be perpendicular to the first internal wall 47 and third internal wall 51. The first internal wall 47 may be parallel to the third internal wall 51. Other configurations, however, may include internal walls that are neither perpendicular nor parallel relative to each other. Plugs may be placed within specific apertures 44 when they are not being used to mount the yaw rate sensor 32.

The yaw rate sensor 32 may be received and located within a chamber or enclosure 46 of the housing 28. The chamber or enclosure 46 may be enclosed by a cover 48 (as shown in FIG. 3) that is secured to the housing 28. The housing 28 and/or the cover 48 may include a passageway 50 that is configured for routing a cable 52 that is connected to the yaw rate sensor 32.

The socket 34 may include a retractable cover 54 that is configured to enclose the socket 34 when the trailer-to-vehicle electrical connector 26 has not been received into the socket 34. The retractable cover 54 may include a spring 56 that is configured to bias the retractable cover 54 in a closed position. The retractable cover 54 may also be configured to secure the position of the trailer-to-vehicle electrical connector 26 when the trailer-to-vehicle electrical connector 26 has been received into the socket 34. The retractable cover 54 may include an engagement mechanism 58 (such as a tab, detent, pin, etc.) that is configured to engage a mating portion of the trailer-to-vehicle electrical connector 26 in order to prevent the trailer-to-vehicle electrical connector 26 from slipping out of the socket 34 once it has been received into the socket 34. The spring 56 that biases the retractable cover 54 in the closed position may also bias the engagement mechanism 58 such that it remains engaged with the mating portion of the trailer-to-vehicle electrical connector 26.

The retractable cover 54 may further include a seal 60 such that a seal is formed between the retractable cover 54 and the socket 34 when the trailer-to-vehicle electrical connector 26 has not been received into the socket 34. Furthermore, the seal 60 may facilitate a seal being formed between the retractable cover 54 and the mating portion of the trailer-to-vehicle electrical connector 26 when the trailer-to-vehicle electrical connector 26 has been received into the socket 34. The seal 60 may be made from any sealing material, including but not limited to, rubber, silicone, or any other soft plastic or material capable of providing a seal between two opposing surfaces. The seal 60 may be configured to prevent the ingress of water, dust, dirt, or other materials into the socket 34 of the docking station 30. The seal may also be configured to prevent the ingress of water, dust, dirt, or other materials into the mating portion of the trailer-to-vehicle electrical connector 26.

The housing 28 may include a plurality of external walls that define mounting holes 64 that are configured to engage fasteners for mounting the housing 28 to the trailer 10 in a plurality of orientations and locations relative to the trailer. The fasteners may comprise screws, bolts, rivets, tie straps, zip ties, or any other fastener known in the art that is capable of engaging mounting holes to secure the housing 28 to the trailer 10. For example, the housing may include a first external wall 62 that is configured to mount up against a portion of the trailer 10. Several mounting holes 64 that are configured to receive fasteners may extend through the first external wall 62 in order to secure the housing 28 to the trailer 10. The housing 28 may also include a second external wall 66 that is configured to mount up against a portion of the trailer 10. Several mounting holes 64 that are configured to receive fasteners may extend through the second external wall 66 in order to secure the housing 28 to the trailer 10. The first external wall 62 may be perpendicular to the second external wall 66. Other configurations, however, may include external walls that are parallel relative to each other or external walls that neither perpendicular nor parallel relative to each other. If some of mounting holes 64 are not being used, plugs may be placed into the holes.

As previously indicated, the housing 28 may be mounted to the trailer 10 in several orientations. For example, the first external wall 62 may be mounted up against a vertical wall of the trailer 10 such that the socket 34 faces outward relative to the trailer 10 or the first external wall 62 may be mounted up against a horizontal wall of the trailer 10 such that the socket 34 faces either upward or downward relative to the trailer 10. Alternatively, the second external wall 66 may be mounted up against a horizontal wall of the trailer 10 such that the socket 34 faces outward relative to the trailer 10 or the second external wall 66 may be mounted up against a vertical wall of the trailer 10 such that the socket 34 faces either upward or downward relative to the trailer 10. One or more leveling devices 69, such as a bubble level, may be attached or incorporated into the housing 28 in order ensure the housing 28, yaw rate sensor 32, and/or docking station 30 are installed in the desired orientation.

Figure 4:
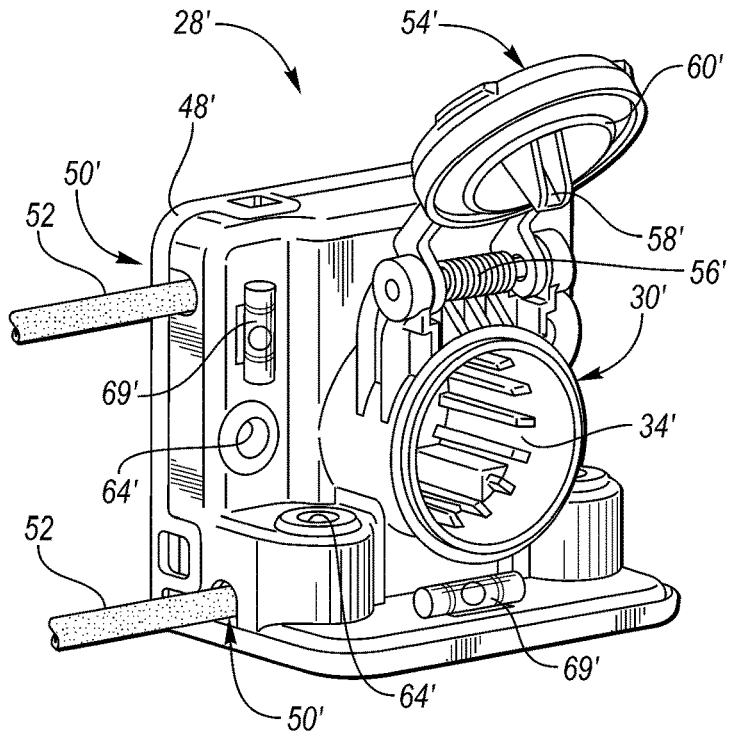
FIG. 4 is a front isometric view of a second embodiment of a housing that includes a docking station for a trailer-to-vehicle electrical connector and a yaw sensor mounted to the housing.
Figure 5:
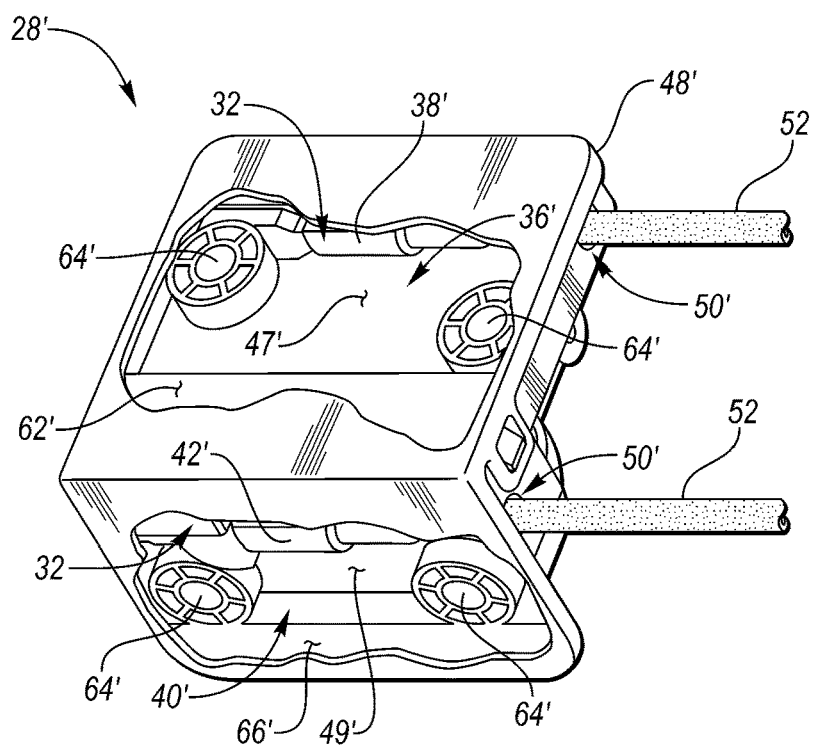
FIG. 5 is a rear isometric view of the second embodiment of the housing that includes the docking station and yaw sensor.

Referring to FIGS. 4 and 5, a second embodiment of a housing 28' is illustrated. The second embodiment of the housing 28' includes a docking station 30' disposed externally on the housing 28'. The housing 28' is further configured to house the yaw rate sensor 32. The docking station 30' may be configured to receive the trailer-to-vehicle electrical connector 26. The docking station 30' may include an externally located non-energized socket 34' that is configured to receive the trailer-to-vehicle electrical connector 26. The yaw rate sensor 32 may be disposed within the housing 28' and configured to detect a yaw rate, $\omega_y$, of the trailer 10 (as shown in FIG. 1). The housing 28' may include plurality of internal chambers configured to receive the yaw rate sensor 32. For example, a first internal chamber 36' and a second internal chamber 40' may be configured to receive the yaw rate sensor 32. The yaw rate sensor 32 may be in a first orientation 38' when received into the first internal chamber 36' and in a second orientation 42' when received into the second internal chamber 40'.

The first internal chamber 36' may be adjacent to a first internal wall 47'. The first internal chamber 36' may be configured to receive the yaw rate sensor 32 such that the yaw rate sensor 32 is adjacent to the first internal wall 47'. The second internal chamber 40' may be adjacent to a second internal wall 49'. The second internal chamber 40' may be configured to receive the yaw rate sensor 32 such that the yaw rate sensor 32 is adjacent to the second internal wall 49'. The first internal wall 47' may be perpendicular to the second internal wall 49'. Other configurations, however, may include internal walls that are parallel relative to each other or internal walls that neither perpendicular nor parallel relative to each other.

The first internal chamber 36' and/or the second internal chamber 40' may be enclosed by a cover 48' that is secured to the housing 28'. The housing 28' and/or the cover 48' may include a passageway 50' that is configured for routing the cable 52 that is connected to the yaw rate sensor 32.

Although FIG. 5 depicts two yaw rate sensors 32, it should be understood that only one yaw rate sensor may be disposed in the housing 28'.

The socket 34' may include a retractable cover 54' that is configured to enclose the socket 34' when the trailer-to-vehicle electrical connector 26 has not been received into the socket 34'. The retractable cover 54' may include a spring 56' that is configured to bias the retractable cover 54' in a closed position. The retractable cover 54' may also be configured to secure the position of the trailer-to-vehicle electrical connector 26 when the trailer-to-vehicle electrical connector 26 has been received into the socket 34'. The retractable cover 54' may include an engagement mechanism 58' (such as a tab, detent, pin, etc.) that is configured to engage a mating portion of the trailer-to-vehicle electrical connector 26 in order to prevent the trailer-to-vehicle electrical connector 26 from slipping out of the socket 34' once it has been received into the socket 34'. The spring 56' that biases the retractable cover 54' in the closed position may also bias the engagement mechanism 58' such that it remains engaged with the mating portion of the trailer-to-vehicle electrical connector 26.

The retractable cover 54' may further include a seal 60' such that a seal is formed between the retractable cover 54' and the socket 34' when the trailer-to-vehicle electrical connector 26 has not been received into the socket 34'. Furthermore, the seal 60' may facilitate a seal being formed between the retractable cover 54' and the mating portion of the trailer-to-vehicle electrical connector 26 when the trailer-to-vehicle electrical connector 26 has been received into the socket 34'. The seal 60' may be made from any sealing material, including but not limited to, rubber, silicone, or any other soft plastic or material capable of providing a seal between two opposing surfaces. The seal 60' may be configured to prevent the ingress of water, dust, dirt, or other materials into the socket 34' of the docking station 30'. The seal may also be configured to prevent the ingress of water, dust, dirt, or other materials into the mating portion of the trailer-to-vehicle electrical connector 26.

The housing 28' may include a plurality of external walls that define mounting holes 64' that are configured to engage fasteners for mounting the housing 28' to the trailer 10 in a plurality of orientations and locations relative to the trailer. The fasteners may comprise screws, bolts, rivets, tie straps, zip ties, or any other fastener known in the art that is capable of engaging mounting holes to secure the housing 28' to the trailer 10. For example, the housing 28' may include a first external wall 62' that is configured to mount up against a portion of the trailer 10. The cover 48' may be disposed between the first external wall 62' and the trailer 10. At least one mounting hole 64' that is configured to receive a fastener may extend through the first external wall 62' in order to secure the housing 28' to the trailer 10. The at least one mounting hole 64' may also extend through the cover 48'. The housing 28' may also include a second external wall 66' that is configured to mount up against a portion of the trailer 10. The cover 48' may be disposed between the second external wall 66' and the trailer 10. At least one mounting hole 64' that is configured to receive a fastener may extend through the second external wall 66' in order to secure the housing 28' to the trailer 10. The at least one mounting hole 64' may also extend through the cover 48'. The first external wall 62' may be perpendicular to the second external wall 66'. Other configurations, however, may include external walls that are parallel relative to each other or external walls that neither perpendicular nor parallel relative to each other.

As previously indicated, the housing 28' may be mounted to the trailer 10 in several orientations. For example, the first external wall 62' may be mounted up against a vertical wall of the trailer 10 such that the socket 34' faces outward relative to the trailer 10 or the first external wall 62' may be mounted up against a horizontal wall of the trailer 10 such that the socket 34' faces either upward or downward relative to the trailer 10. Alternatively, the second external wall 66' may be mounted up against a horizontal wall of the trailer 10 such that the socket 34' faces outward relative to the trailer 10 or the second external wall 66' may be mounted up against a vertical wall of the trailer 10 such that the socket 34' faces either upward or downward relative to the trailer 10. One or more leveling devices 69', such as a bubble level, may be attached or incorporated into the housing 28' in order ensure the housing 28', yaw rate sensor 32, and/or docking station 30' are installed in the desired orientation.

Figure 6:
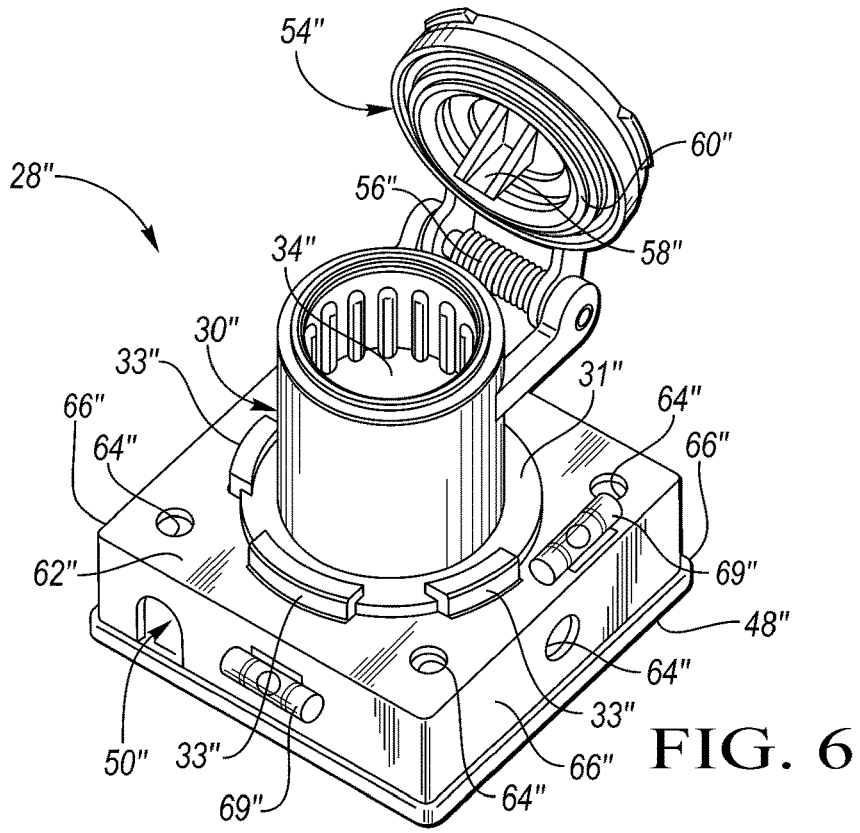
FIG. 6 is a top isometric view of a third embodiment of a housing that includes a docking station for a trailer-to-vehicle electrical connector and a yaw sensor mounted to the housing.
Figure 7:
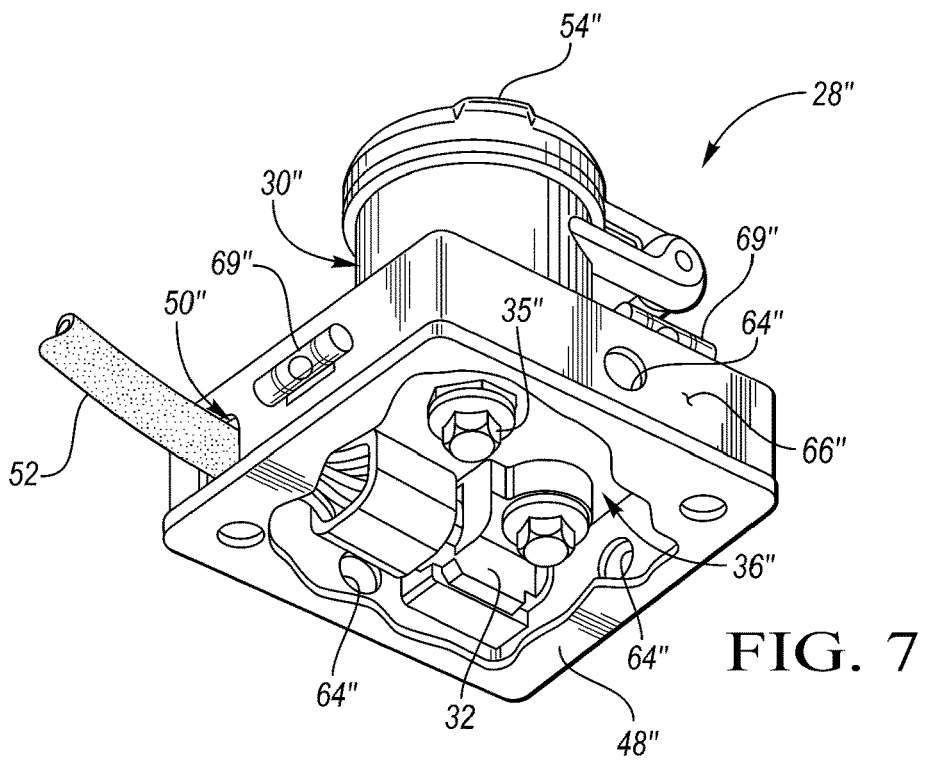
FIG. 7 is a bottom isometric view of the third embodiment of the housing that includes the docking station and yaw sensor.

Referring to FIGS. 6 and 7, a third embodiment of a housing 28" is illustrated. The third embodiment of the housing 28" includes a docking station 30" disposed externally on the housing 28". The docking station may be an integral part of the housing 28" or may be connected to the housing 28" in some other manner. For example, the docking station 30" may include a flange 31" that engages at least one detent 33" on the housing 28" in order to secure the docking station 30" to the housing 28". In addition or alternatively, at least one fastener 35" may be used to secure the docking station 30" to the housing 28". The housing 28" is further configured to house the yaw rate sensor 32. The docking station 30" may be configured to receive the trailer-to-vehicle electrical connector 26. The docking station 30" may include an externally located non-energized socket 34" that is configured to receive the trailer-to-vehicle electrical connector 26. The yaw rate sensor 32 may be disposed within the housing 28" and configured to detect a yaw rate, $\omega_y$, of the trailer 10 (as shown in FIG. 1). The housing 28" may include an internal chamber 36" configured to receive the yaw rate sensor 32. The internal chamber 36" may be enclosed by a cover 48". The housing 28" and/or the cover 48' may include a passageway 50" that is configured for routing the cable 52 that is connected to the yaw rate sensor 32.

The socket 34" may include a retractable cover 54" that is configured to enclose the socket 34" when the trailer-to-vehicle electrical connector 26 has not been received into the socket 34". The retractable cover 54" may include a spring 56" that is configured to bias the retractable cover 54" in a closed position. The retractable cover 54" may also be configured to secure the position of the trailer-to-vehicle electrical connector 26 when the trailer-to-vehicle electrical connector 26 has been received into the socket 34". The retractable cover 54" may include an engagement mechanism 58" (such as a tab, detent, pin, etc.) that is configured to engage a mating portion of the trailer-to-vehicle electrical connector 26 in order to prevent the trailer-to-vehicle electrical connector 26 from slipping out of the socket 34" once it has been received into the socket 34". The spring 56" that biases the retractable cover 54" in the closed position may also bias the engagement mechanism 58" such that it remains engaged with the mating portion of the trailer-to-vehicle electrical connector 26.

The retractable cover 54" may further include a seal 60" such that a seal is formed between the retractable cover 54" and the socket 34" when the trailer-to-vehicle electrical connector 26 has not been received into the socket 34". Furthermore, the seal 60" may facilitate a seal being formed between the retractable cover 54" and the mating portion of the trailer-to-vehicle electrical connector 26 when the trailer-to-vehicle electrical connector 26 has been received into the socket 34". The seal 60" may be made from any sealing material, including but not limited to, rubber, silicone, or any other soft plastic or material capable of providing a seal between two opposing surfaces. The seal 60" may be configured to prevent the ingress of water, dust, dirt, or other materials into the socket 34" of the docking station 30". The seal may also be configured to prevent the ingress of water, dust, dirt, or other materials into the mating portion of the trailer-to-vehicle electrical connector 26.

The housing 28" may include a plurality of external walls that define mounting holes 64" that are configured to engage fasteners for mounting the housing 28" to the trailer 10 in a plurality of orientations and locations relative to the trailer. The fasteners may comprise screws, bolts, rivets, tie straps, zip ties, or any other fastener known in the art that is capable of engaging mounting holes to secure the housing 28" to the trailer 10. For example, the housing 28" may include a front wall 62" that includes at least one mounting hole 64" that is configured to receive a fastener in order to mount the housing 28" to a portion of the trailer 10. The cover 48" may also include at least one mounting hole that aligns with the at least one mounting hole 64" in the housing 28" if the cover 48" is disposed between the front wall 62" and the trailer 10. The housing 28" may also include side walls 66" that are configured to mount up against a portion of the trailer 10. At least one mounting hole 64" that is configured to receive a fastener may extend through the side walls 66" in order to mount the housing 28" to a portion of the trailer 10.

As previously indicated, the housing 28" may be mounted to the trailer 10 in several orientations. For example, the cover 48" may be mounted up against a vertical wall of the trailer 10 such that the socket 34" faces outward relative to the trailer 10 or the cover 48" may be mounted up against a horizontal wall of the trailer 10 such that the socket 34" faces either upward or downward relative to the trailer 10. Alternatively, one of the side walls 66" may be mounted up against a horizontal wall of the trailer 10 such that the socket 34" faces outward relative to the trailer 10 or the side wall 66" may be mounted up against a vertical wall of the trailer 10 such that the socket 34" faces either upward or downward relative to the trailer 10. One or more leveling devices 69'", such as a bubble level, may be attached or incorporated into the housing 28" in order ensure the housing 28", yaw rate sensor 32, and/or docking station 30" are installed in the desired orientation.

Figure 8A:
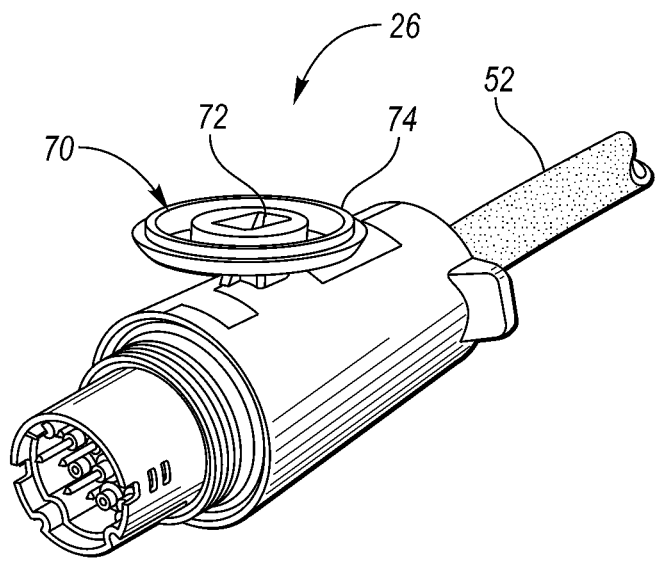
FIG. 8A is an isometric view of the trailer-to-vehicle electrical connector.

Referring to FIG. 8A, the trailer-to-vehicle electrical connector 26 is illustrated. The mating portion 70 of the trailer-to-vehicle electrical connector 26 that engages the engagement mechanism 58 of the retractable cover 54 is shown. The mating portion 70 may include a receptacle 72 that is configured to receive the engagement mechanism 58 of the retractable cover 54. Furthermore, the mating portion 70 may include a seat portion 74 that is configured to engage the seal 60 such that a seal is formed between the retractable cover 54 and the mating portion 70 of the trailer-to-vehicle electrical connector 26 when the trailer-to-vehicle electrical connector 26 has been received into the socket 34.

Figure 8B:
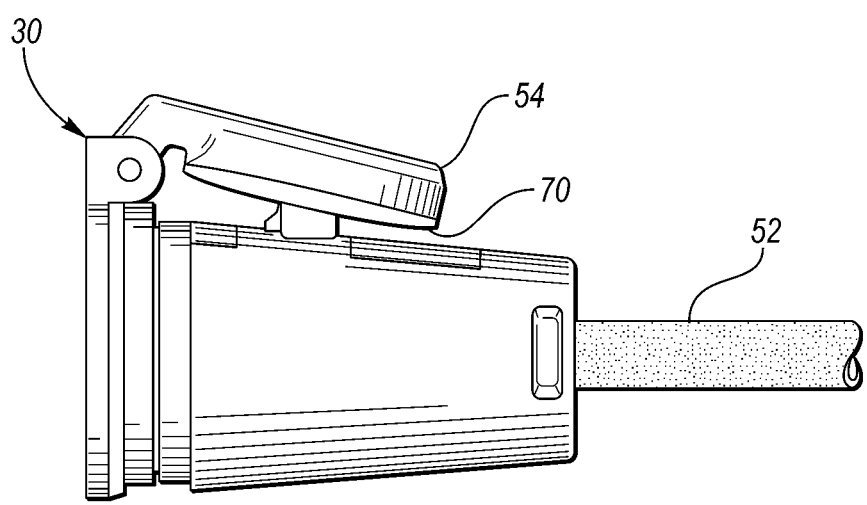
FIG. 8B is side view of the trailer-to-vehicle electrical connector mating with the docking station.

Referring to FIG. 8B, the trailer-to-vehicle electrical connector 26 is shown mating with the docking station 30. The trailer-to-vehicle electrical connector 26 has been received into the socket 34 of the docking station 30, and the engagement mechanism 58 of the retractable cover 54 has been inserted into the receptacle 72 such that the retractable cover 54 is seated on the mating portion 70 of the trailer-to-vehicle electrical connector 26.

The disclosure should not be construed as limited to the type of trailer 10 depicted in FIG. 1, but should be construed to include any type of trailer that is configured to support any type of load and is also configured to connect to a towing vehicle. For example, the trailer could be configured to support the hull of the boat, the trailer could be a tanker that is configured to receive a liquid load, the trailer could be enclosed, etc.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A trailer yaw sensing apparatus comprising:
   a housing configured for installation on a trailer, and defining apertures configured to engage fasteners for mounting yaw sensors in a plurality of orientations;
   a yaw sensor including an external casing, and disposed within the housing; and
   a socket defined by the housing, having no electrical connectors, configured to receive a trailer-to-vehicle electrical connector, and configured to remain non-energized when the connector is received therein.

2. The trailer yaw sensing apparatus of claim 1, wherein the housing includes a plurality of internal walls that collectively define an enclosure that houses the sensor, and wherein the internal walls individually define at least one of the apertures configured to engage fasteners for mounting yaw sensors in a plurality of orientations.

3. The trailer yaw sensing apparatus of claim 2, wherein the plurality of internal walls includes a first internal wall and a second internal wall, and wherein the first internal wall is perpendicular to the second internal wall.

4. The trailer yaw sensing apparatus of claim 2, wherein the plurality of internal walls includes a first internal wall and a second internal wall, and wherein the first internal wall is parallel to the second internal wall.

5. The trailer yaw sensing apparatus of claim 1, wherein the housing includes a plurality of external walls that define mounting holes that are configured to engage fasteners for mounting the housing to the trailer in a plurality of orientations relative to the trailer.

6. The trailer yaw sensing apparatus of claim 5, wherein the plurality of external walls includes a first external wall and a second external wall, and wherein the first external wall is perpendicular to the second external wall.

7. The trailer yaw sensing apparatus of claim 1, further comprising a cover that is secured to the housing in order to enclose the yaw sensor.

8. The trailer yaw sensing apparatus of claim 1, wherein the housing includes a passageway for routing a cable into the housing for connection with the yaw sensor.

9. The trailer yaw sensing apparatus of claim 1, wherein the socket includes a retractable cover configured to enclose the socket when the trailer-to-vehicle electrical connector has not been received into the socket and to engage a receptacle on the trailer-to-vehicle electrical connector when the trailer-to-vehicle electrical connector has been received into the socket in order to secure the position of the trailer-to-vehicle electrical connector.

10. The trailer yaw sensing apparatus of claim 9, wherein the retractable cover forms a seal between the cover and the socket when the trailer-to-vehicle electrical connector has not been received into the socket, and wherein the retractable cover forms a seal between the cover and the receptacle on the trailer-to-vehicle electrical connector when the trailer-to-vehicle electrical connector has been received into the socket.

11. A trailer yaw sensing apparatus comprising:
    a housing configured for installation on a trailer, and defining mounting holes configured to engage fasteners for mounting the housing to the trailer in multiple orientations relative to the trailer, the housing including an external non-energized socket having no electrical connectors that is configured to receive a trailer-to-vehicle electrical connector and remain non-energized when the electrical connector is received therein, and the housing defining at least one internal chamber configured to receive yaw sensors; and
    a yaw sensor including an external casing, and disposed within an internal chamber of the housing.

12. The trailer yaw sensing apparatus of claim 11, wherein the housing defines a first internal chamber that is adjacent to a first internal wall of the housing, and wherein the first internal chamber is configured to receive the yaw sensor such that the yaw sensor is adjacent to the first internal wall.

13. The trailer yaw sensing apparatus of claim 11, further comprising a level incorporated with the housing.

14. The trailer yaw sensing apparatus of claim 11, wherein the socket includes a retractable cover configured to enclose the socket when the trailer-to-vehicle electrical connector has not been received into the socket and to engage a receptacle on the trailer-to-vehicle electrical connector when the trailer-to-vehicle electrical connector has been received into the socket in order to secure the position of the trailer-to-vehicle electrical connector.

15. The trailer yaw sensing apparatus of claim 14, wherein the retractable cover forms a seal between the cover and the socket when the trailer-to-vehicle electrical connector has not been received into the socket, and wherein the retractable cover forms a seal between the cover and the receptacle on the trailer-to-vehicle electrical connector when the trailer-to-vehicle electrical connector has been received into the socket.

16. A trailer system comprising:
    a frame;
    a trailer-to-vehicle electrical connector;
    a housing secured to the frame, including a non-energized external socket configured to receive the connector and remain non-energized when the connector is received therein, and defining an internal chamber configured to receive a sensor;
    a yaw sensor mounted within the internal chamber; and
    a retractable cover configured to enclose and seal the socket when the connector has not been received into the socket.

17. The trailer system of claim 16, wherein the retractable cover is configured to engage a receptacle on the trailer-to-vehicle electrical connector when the trailer-to-vehicle electrical connector has been received into the socket in order to secure the position of the trailer-to-vehicle electrical connector.

* * * * *